United States Patent [19]
deRosa

[11] Patent Number: 4,733,242
[45] Date of Patent: Mar. 22, 1988

[54] SUBMARINE DETECTION SYSTEM

[75] Inventor: Louis A. deRosa, Upper Montclair, N.J.

[73] Assignee: ITT Corporation, Nutley, N.J.

[21] Appl. No.: 829,181

[22] Filed: Jul. 20, 1959

[51] Int. Cl.[4] ............................................... G01S 3/02
[52] U.S. Cl. .................................... 342/458; 342/459; 342/453; 342/22
[58] Field of Search ...................... 343/112, 12, 100.7; 324/6; 342/13, 22, 458, 459, 460, 453; 367/128

[56] References Cited
U.S. PATENT DOCUMENTS
2,513,279  7/1950  Bradley.
2,659,882  11/1953  Barret.
2,940,076  7/1960  Bissett et al.

Primary Examiner—Theodore M. Blum
Attorney, Agent, or Firm—Robert A. Walsh; Thomas N. Twomey; Mary C. Werner

[57] ABSTRACT

A system for detecting the presence and depth of an object submerged in a medium having transmission characteristic substantially different than the atmosphere by means of receiving radiation from lighting incident to a reflected from the submerged object.

7 Claims, 24 Drawing Figures

SUBMARINE DETECTION SYSTEM

This invention relates to a detection system for submerged objects and more particularly to a system for detecting the presence of submerged objects by means of radiated electromagnetic energy regardless of the source of said energy.

The importance and the gravity of the problem of detecting submarines cannot be over emphasized. In the last two world wars, the democracies were close to the verge of defeat because of the relentless ferocity of the submarine warfare waged by the enemy and only by Herculean efforts was defeat averted. Today, it is more important than ever before because of the new found capability of submarines equipped with nuclear propulsion machinery to cruise indefinitely and their ability to carry and fire missiles having ranges of several thousand miles. Sonar has been employed for subsurface object detection and observers flying overhead can visually detect underwater objects. These means, however, are limited in range and depth. Sonar capability is limited by sound's distortion as it strikes the temperature ducts of the sea and by its limited capability for discrimination. There are limits to visual observation, such as, unfavorable weather conditions, and sonar devices often detect the presence of schools of fish and other inoffensive objects which are mistaken for submarines. These detection devices are also relatively expensive and have limited range. Radar cannot be used successfully because high frequency signals are rapidly attenuated in sea water. Low frequency radio signals within the audio range suffer much less attenuation but to transmit such signals requires tremendously long antennas and enorous power. For example, to transmit radio signals of the frequency of 1,000 cps would require an antenna approximately 46.5 miles long, the quarter wavelength of the signal at that frequency. It is obvious that it is impossible to build antennas to operate at such low frequencies, but, at the same time, there is great necessity for such a system.

It is an object of this invention, therefore, to provide a system for detecting the presence of a submerged object and also the approximate depth thereof at distances greater than are possible by detection systems heretofore known.

It is a further object to provide a submarine detection system capable of utilizing electromagnetic radiation of low frequencies regardless of the source of such radiation.

A feature of this invention is the provision of means to receive an incident radiation of electromagnetic energy and also the reflection of said radiation caused by the presence of an object submerged in a medium having radiation transmission characteristics substantially different than the atmosphere. Means are provided to compare the reflected radiation with the incident radiation to determine the time difference therebetween, the time difference detected being a measure corresponding substantially to the depth of the submerged object.

These and other features and objects of this invention will become more apparent by reference to the following description taken in conjunction with the accompanying drawings, in which.

Figure 1:
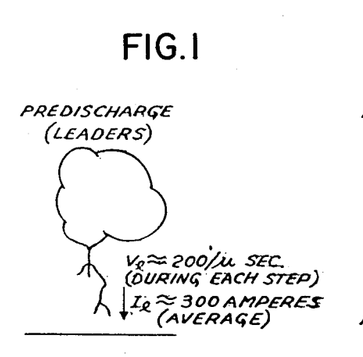
FIGS. 1 and 2 are illustrations of the lightning discharge generation.
Figure 2:
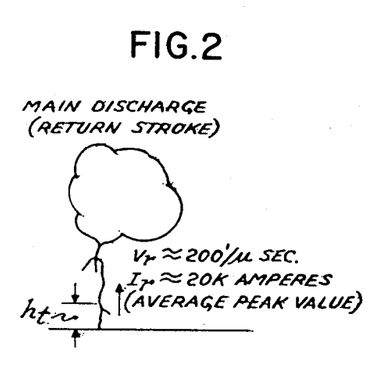
Figure 3:
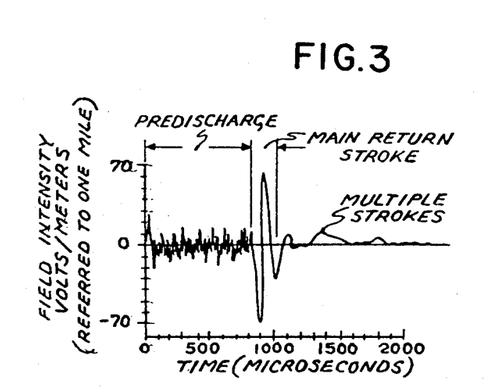
FIG. 3 is the waveform of the effective radiated electric field of a lightning discharge.
Figure 4:
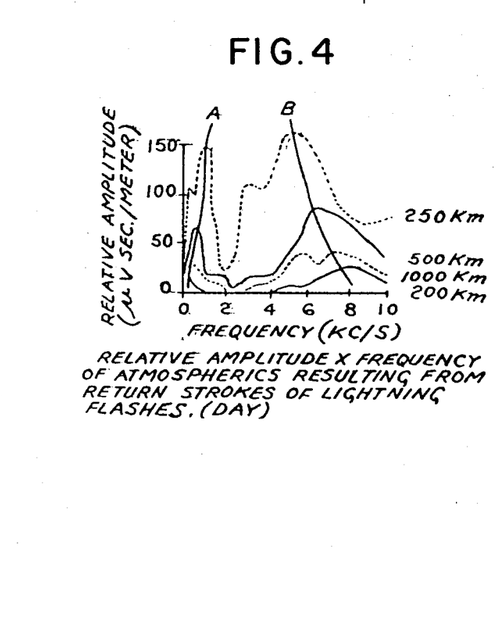
FIG. 4 is a graph showing the relative amplitude and frequency distribution of the components of a lightning flash in the low frequency spectrum.
Figure 5:
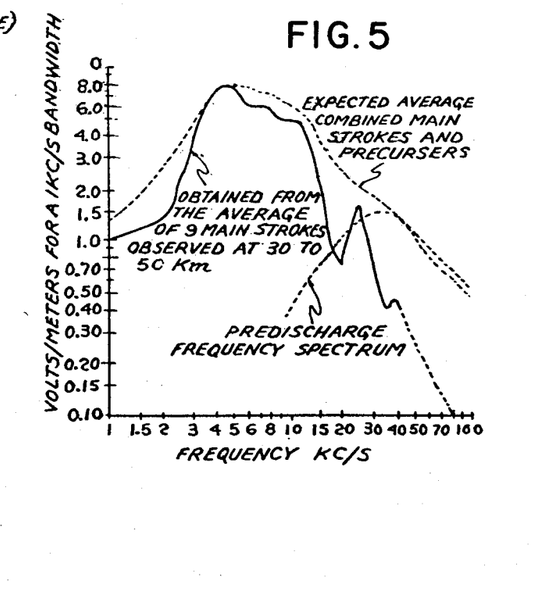
FIG. 5 is the frequency spectrum of the radiation component at a distance of 1 mile from the source of the discharge.

Radio noise falls into several categories, such as atmospheric, galactic, solar precipitation, thermal and man made. Below about 30 megacycles and particularly in the vlf (very low frequency) range, atmospheric noise is usually the most important of these types of noise. It is now clear that the main factors influencing the waveform of an atmospheric are the distance of the source from the observing station and the condition of the lower ionosphere. Lightning is the most effective terrestrial source of radiation in the vlf range. The exact mechanism of lightning discharge is very complex. If has been shown, however, that the discharge is initiated by a weakly ionized, slow moving pilot streamer which in general advances from the clouds toward the ground in spurts of 30 to 200 feet with velocities in the order of 1 to 2 feet per microsecond. This pilot is followed by a highly ionized leader as shown in FIG. 1 which travels at approximately 200 feet per microsecond producing a current pulse in the order of 300 amperes whose length is approximately one microsecond. The pilot again moves forward and the process repeats itself every 25 to 100 microseconds. These short pulses and the branch leaders repeated at rates of from 10 to 40 kc radiate energy during this period, known as the predischarge, which has a total length in the order of 1 millisecond. This length obtained by employing an average height of 5,000 feet is in good agreement with observations of the electric field. Once the leader reaches the ground as shown in FIG. 2, the main or return stroke with average peak current values of 20 kiloamperes starts upward at a velocity in the order of 200 feet/microsecond. A typical recording of the electric field variation at a distance of 20 km from the source is shown (referred in amplitude only to a distance of one mile) in FIG. 3 where the relative shapes and amplitudes of the predischarge and main stroke portions are readily apparent. Once the main stroke is complete, it may be followed by one or more multiple strokes which in general follow the original ionized path and will probably have a considerably different form of leader stroke. Since over half of the cloud-to-ground discharges have two or more strokes, this factor must be considered in determining the average relative amount of energy radiated from the predischarge and main stroke as a function of frequency. FIG. 5 shows the frequency spectrum of the energy contained in the predischarge strokes and the main discharge strokes and the average of both the main strokes and the predischarge strokes. It should be noted that energy from the predischarge is radiated over approximately 1 millisecond, while the lower frequency components of the main discharge are radiated in 100 to 200 microseconds. It has been found that a considerable amount of high frequency energy is present in the predischarge portion while the main discharge portion contains energy of the lower frequency spectrum. In FIG. 4 is shown the relative amplitude of the frequency components of lightning discharges as received at four different distances from the source. As to be expected, the amplitude decreases as the distance of propagation increases. The marked drop in the curves in the region 2 kc/s is indicative of selective attenuation of these components on an increasing scale with distance.

Figures 6, 7:
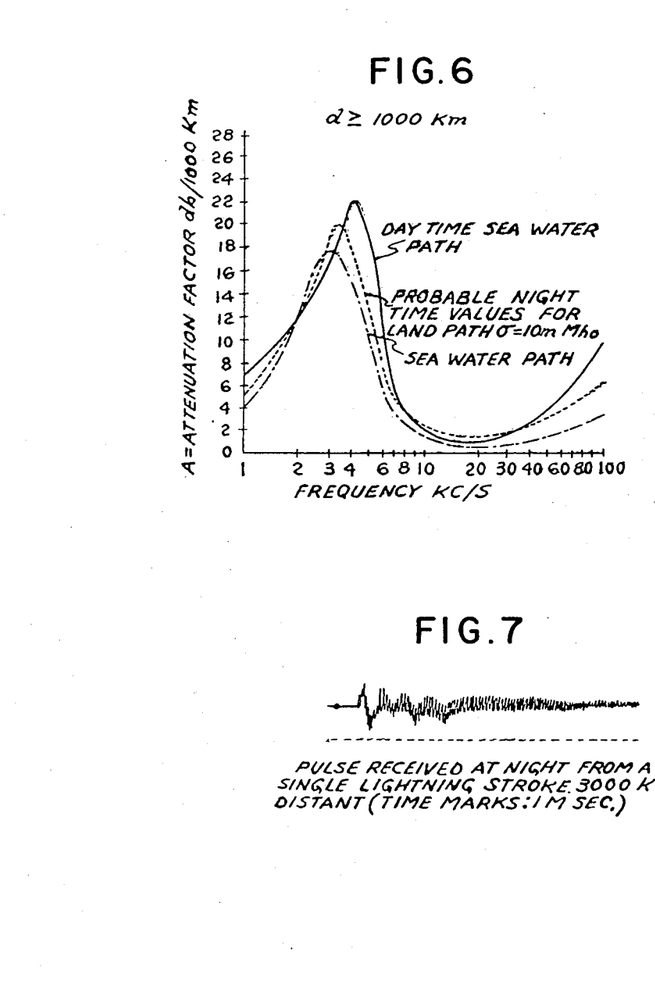
FIG. 6 is a graph of the attenuation factor versus frequency of the lightning discharge.
FIG. 7 shows the pulsations of a single lightning stroke.

Recent studies have shown that the vertical electric field propagated at great distances from the source can be represented by an expression having the form $$E_d \simeq \frac{E_o \times 0.4 \times 10^{-(Ad/2 \times 10^4)}}{\sqrt{d} \sqrt{f}}$$

$$1000 \leq d \leq 8000,$$

where $E_d$ is the vertical electric field at a distance d from the source, d is this distance in kilometers, $E_o$ is the effective radiated field at 1 mile from the source usually expressed in v/m, f is the frequency in kc, and A is the attenuation factor in db/1000 km. The factor A is presented in FIG. 6. The sea water curve indicates a desired preference for frequencies in the order of 15 to 20 kc. It is also notable that frequencies within the ranges of 2 to approximately 6 kc/s show the greatest attenuation. There are other characteristics of the frequency component generated by the lightning flash. Under typical night conditions, a received lightning pulse has a distinct tonal quality, or whistle. The pulse is usually received as a long train of oscillations with gradually increasing period; the longest period of oscillation is always in the neighborhood of 1700 cycles. The duration of the received pulse may be as long as 100 msec although the originating pulse was less than 0.1 msec. During the day, the received pulse is typically of much shorter duration, of the order of 5 msec., and hence exhibits on tonal quality. The cut-off frequency of 1700 cycles is by no means the lower limit of the spectrum. The atmospheric pulse also exhibits considerable amplitude in the frequency range below a few hundred cycles. FIG. 7 shows a pulse typical of those received at night; the initial portion is in the vicinity of 5 kc with quasi-periodic components diminishing to the cut-off frequency of 1700 cycles; superimposed on the quasi-periodic components are seen considerably lower frequency components in the vicinity of 10 to 600 cycles.

Figure 8:
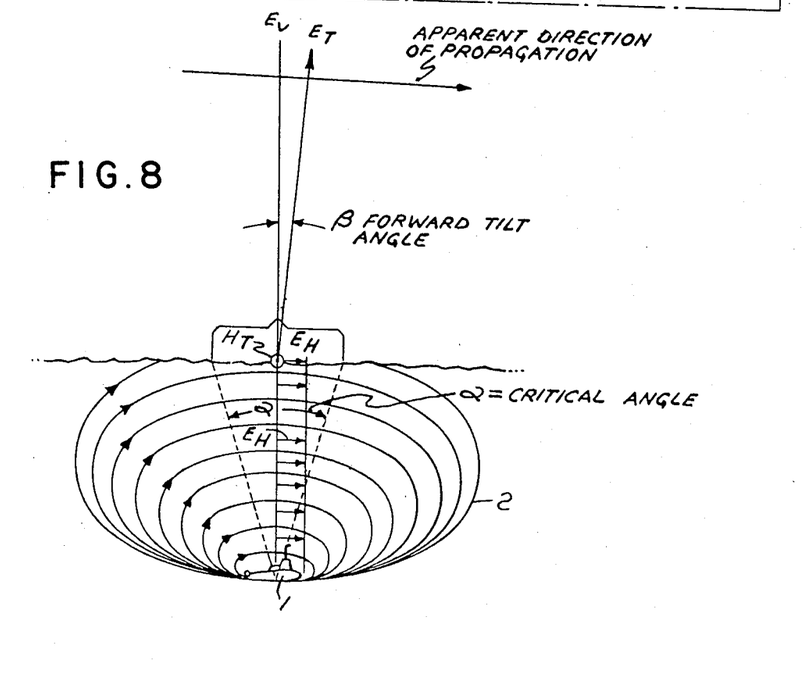
FIG. 8 is the diagram showing the incident field and the reflected field from a submerged object.

Nearly all high-current lightning strokes are essentially vertical between cloud and ground. Consequently, the radiated electric field will propagate with vertical polarization. Reception of this field is readily achieved with several possible antenna types of which the following are three examples: (a) a conventional vertically polarized antenna consisting of a horizontal wire elevated above the ground; (b) a loop antenna in a vertical plane; and (c) a ground dipole. The nature of a plane linearly polarized wave traveling at slight angle to a plane boundary, in this case sea water, is shown in FIG. 8. A propagating vertical electric field possesses a slight forward tilt in the vicinity of the earth's surface because of the partial conductivity of the earth at the frequencies in the audio range. Plane wave analysis indicates that for this mode of propagation alone, that is for the atmospheric noise, ratios of incident energy to "disturbing" energy or reflected energy will be on the order of 85 db at 100 cps and 94 db at 1 kc for reflecting surfaces in 25 meters of sea water. Consider a plane wave incident on the surface of the water and assume simple harmonic time variation of the electric and magnetic field intensities. A fraction of the incident energy will be transmitted into the water and the remainder will be reflected. Now suppose that the sea bottom is a perfect plane reflector so that when the wave reaches bottom, it is completely reflected back onto the surface. At the sea-to-air boundary, a fraction of the incident energy will be transmitted into the air and the remainder will be reflected downward. Assuming the E-vector in the plane of incidence (plane of the paper) then at the boundary, the normal to the wave is tilted slightly because, as stated above, the water is a partial conductor. This tilt produces a tangential component of electric field intensity which accounts for energy flow into the water. If we assume essentially vertically polarized waves, then angles of incidence comparable to the tilt angle assume importance because these will prevail in general. $E_t$ is the total E vector, $E_v$ is the vertical component of $E_t$ and $E_h$ is the horizontal component of $E_t$ due to the forward tilt angle $\beta$. It is this horizontal component, $E_h$, which penetrates into the water and will strike the submerged object 1. When this occurs, the submerged object 1 acts as a radiator or antenna and propagates reflected electromagnetic waves. The E vector of the spreading reflected electromagnetic wave is approximately in the shape of ellipses 2 terminating at the submerged object in the same fashion as radiations from any antenna. There is a critical angle $\alpha$ within which area some power of the reflected wave will penetrate and propagate in the air space. But most of the power will be reflected back into the water. The reflected wave that penetrates into the air causes perturbations of the electromagnetic field of the incident wave and these perturbations are amenable to detection above the surface of the water at reasonable distances from the source of the disturbance, i.e., the submerged object.

Figure 9:
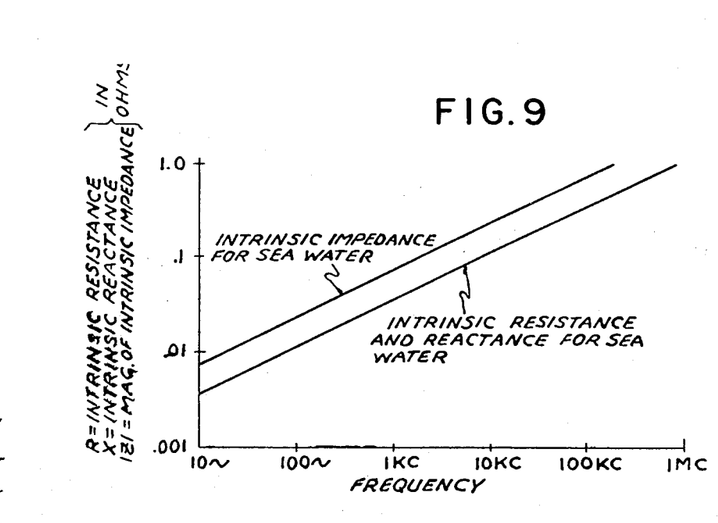
FIG. 9 is a graph showing the variation of the intrinsic impedance of sea water with frequency.
Figure 10:
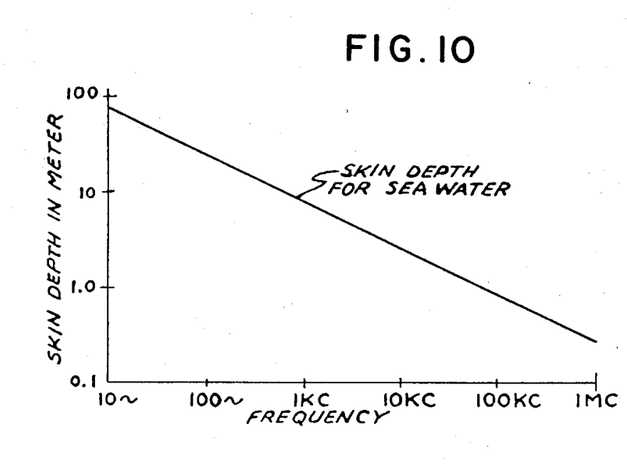
FIG. 10 shows the variation of skin depth with frequency in sea water.
Figure 11:
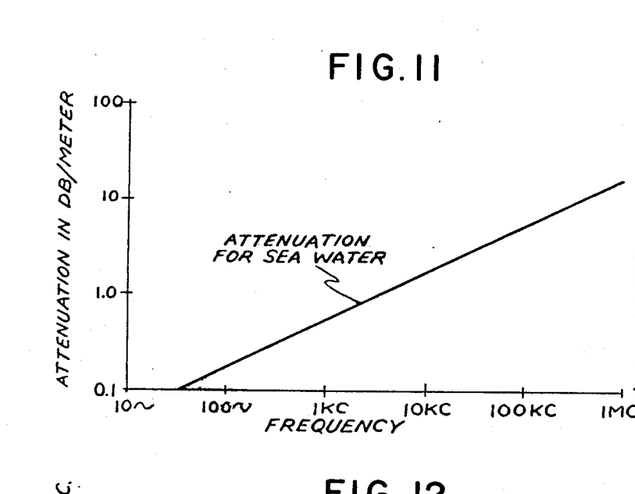
FIG. 11 is a graph showing variation of attenuation of sea water with frequency.
Figure 12:
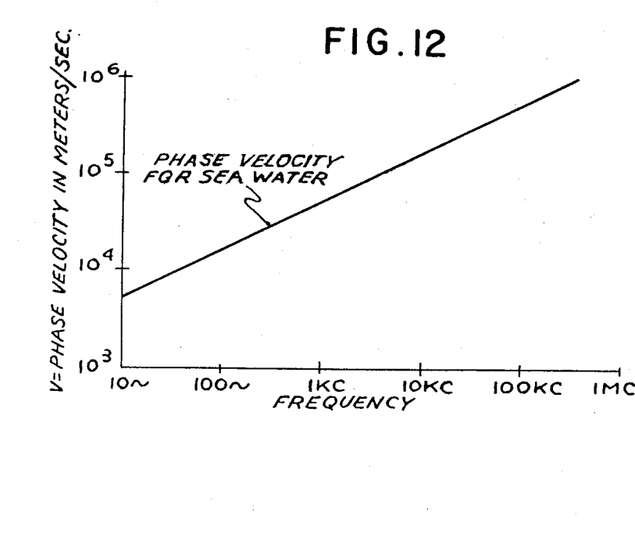
FIG. 12 is a graph showing the variation of velocity of a signal in sea water with frequency.
Figure 13:
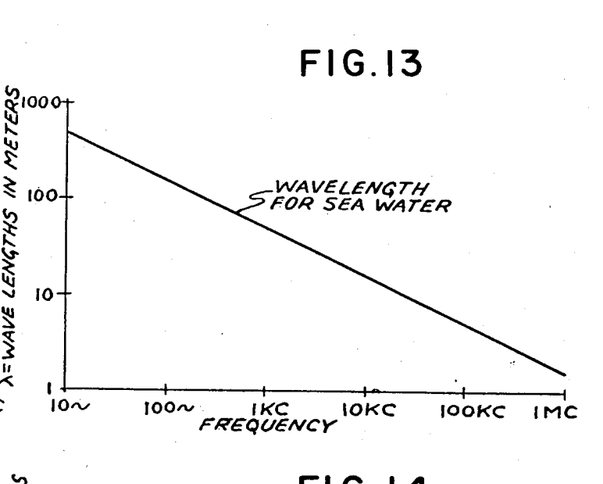
FIG. 13 is a graph showing the variation of wavelength in sea water with frequency.
Figure 14:
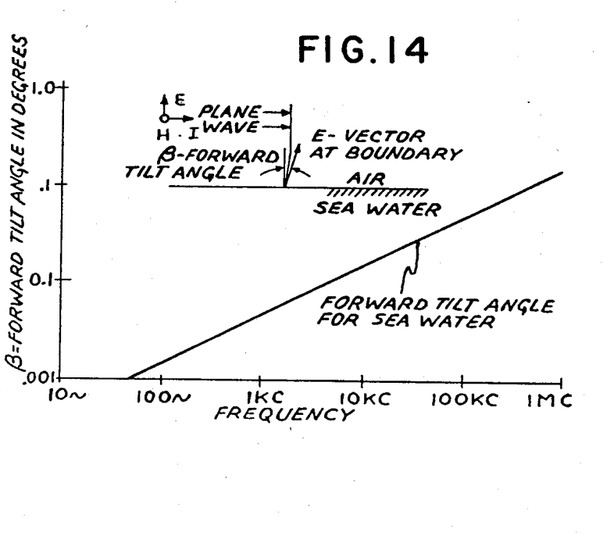
FIG. 14 is a graph showing the variation of tilt angle of an electromagnetic plane wave traveling over a plane boundary.
Figure 15:
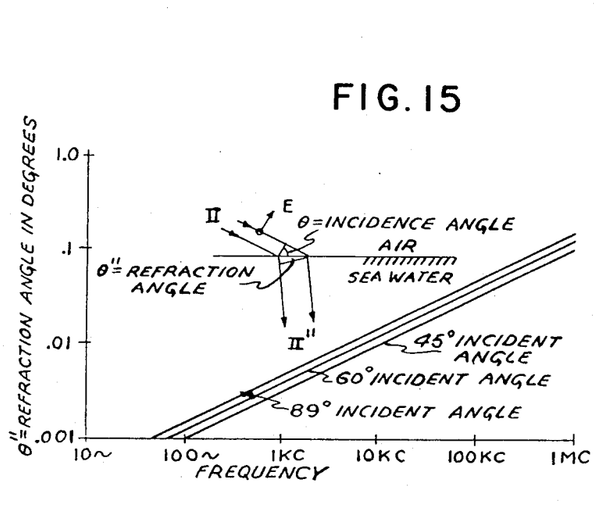
FIG. 15 is a graph showing the variation of refraction angle with frequency.
Figure 16:
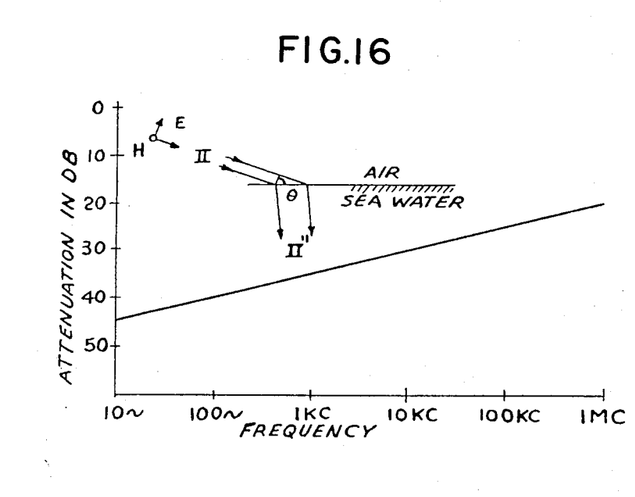
FIG. 16 is a graph showing the variation of attenuation of air-to-sea boundary with frequency.

It will be shown that the incident wave transmitted into water and reflected back will return with sufficient signal strength that a sensitive receiver properly oriented will be capable of receiving in the air space above the submerged reflecting object after the reflected signals are transmitted through the water and into air. It is instructive to examine the characteristics of a wave which penetrates the sea-to-air boundary, travels to a submerged object, is reflected and finally emerges into the air. The values used for the constants of the three media, air, sea water, and a plane reflector, are those given in most texts on electromagnetics. FIG. 9 is a plot of a magnitude of the intrinsic impedance for sea water and as expected shows that with increasing frequency the intrinsic impedance linearly increases. FIG. 10 is a plot of skin depth as a function of frequency. "Skin depth" is the depth below the surface of a conductor at which the current density has been reduced to 1/e times its value at the surface of the conductor where e=2.718. The skin depth is given by the expression $$\delta = \frac{1}{\sqrt{\pi f \mu T}}$$

where $\delta$ equals the depth in meters, f is the frequency in cps, $\mu$ is the permeability in henries/meter and T equals the conductivity in mhos/meter. FIG. 11 is the attenuation of sea water in db per meter as a function of frequency. Here again, as is to be expected, the attenuation decreases linearly with increasing frequencies. FIG. 12 is a plot of phase velocity as a function of frequency. Whereas in the air this velocity is constant, in sea water it increases with frequency and results in frequency distortion of the waves. This dispersive or dissipative property may be used to advantage. FIG. 13 is a plot of wavelength as a function of frequency. Whereas in air the wavelength varies inversely as the first power of frequency; in sea water it varies inversely as the half power. This shows that the wave in sea water is greatly compressed as the velocity of the wave is slowed up by the resistance of the sea water. The variation of the forward tilt angle of a plane linearly polarized wave with frequency is shown in FIG. 14. FIG. 15 is a plot of the angle of refraction $\phi''$ as a function of frequency for three values of angle of incidence $\theta$ for an oncoming wavefront. For an incident plane linearly-polarized wave with the E-vector in the plane of incident, FIG. 15 shows that the refraction angle is extremely small. Therefore, the wave travels almost vertically downward and within limits the direction is independent of the angle of incidence. FIG. 16 shows the variation of the transmitted power density from air to sea at the boundary as a function of frequency with the angle of incidence varying between zero and 89.9 degrees. This curve shows that for increasing frequency the boundary becomes more penetrable. For example, at 10 kc the boundary loss is approximately 30 db; at 1 megacycle it is approximately 20 db.

Figure 17:
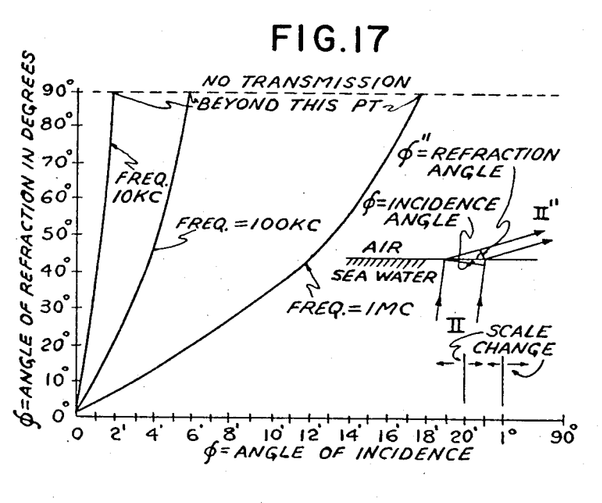
FIG. 17 is a graph showing the angle of refraction as a function of the angle of incidence.
Figure 18:
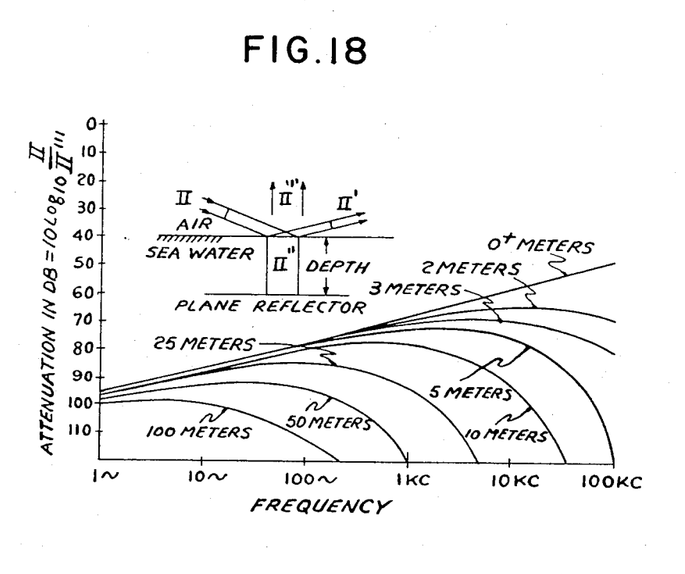
FIG. 18 is a graph showing the variation of attenuation with frequency and depth.
Figure 19:
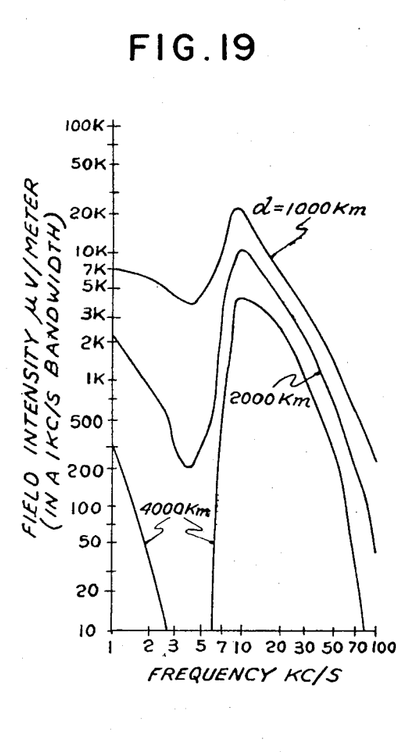
FIG. 19 is a graph showing the frequency spectrum of average lightning discharge source.
Figure 20:
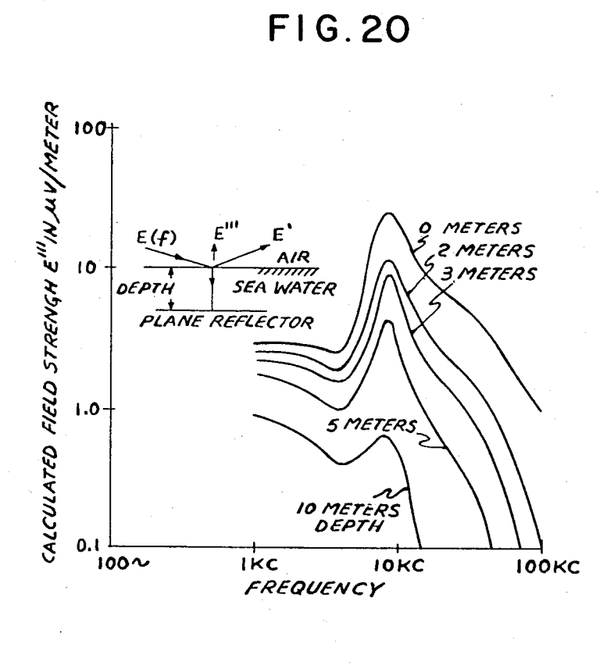
FIG. 20 is a graph showing calculated field strength.

FIG. 17 is a plot of angle of refraction as a function of incidence angle in passing from sea water into air. Again, the E vector is assumed in the plane of incidence. For 100 kc this plot shows that the wave is completely reflected for angles of incidence exceeding 6 minutes. The corresponding angle for 10 kc is 2 minutes. The nature of the incident wave considered here is the same as that of a wave which penetrates the air-to-sea boundary, travels to the sea bottom and is reflected by a perfect and parallel plane reflector, and is then incident on the sea-to-air boundary. The implication here is that, in the plane wave case, the amount of energy transmitted back out of the water will depend largely on the orientation of the reflecting surface in the water. FIG. 18 is a plot of the attenuation between the original incident wave and the wave which finally emerges from the water, after the grip through the air-to-sea boundary, down to bottom, back up and through the sea-to-air boundary. The attenuation in db is plotted as a function of frequency for several different depths of the plane reflector. It has been assumed that the wave when reflected by the plane reflector returns to the surface vertically so that we have normal incidence at the sea-to-air boundary. These curves show that for a given depth there exists a frequency to which the attenuation is a minimum. Also, the boundary loss is more significant for low frequencies; the depth loss is more significant for high frequencies. FIG. 19 illustrates the calculated frequency spectrum of average electrical storm noise. The noise spectrum is given in terms of the electric field intensity, for a one kc bandwidth to an average lightning discharge source 1000 kilometers distance and more and over the daytime sea water path. FIG. 20 is a plot which combines the results of FIG. 18 with FIG. 19 to give the resulting field intensity as the function of frequency after the wave has completed the trip shown in the diagram. The curves show generally that the maximum field intensity at 8500 cps is preserved, but at greater depth its peak is less pronounced. The data used in this treatment assumes plane waves and plane reflection and does not provide the true value of field strength. In the plane wave treatment and utilizing plane reflection, the field strength does not reflect the reactive power as well as reradiated power and reflected power which will provide energy levels that are higher than shown in the graph of FIG. 20. Since a submerged body has finite dimensions and not the infinite dimensions utilized for calculations with the plane reflector, the field strength will be higher.

When the horizontal component $E_h$ of the incident electromagnetic wave penetrates into the water, as described above, and strikes a submerged metallic object, such as a submarine, the submerged object acts as a radiator or antenna and propagates reflected electromagnetic waves. There is reason to believe that the submerged object can be approximated by a distribution of horizontal electric dipoles. The magnetic field in the neighborhood of a submerged horizontal electric dipole, or the near field strength in air, varies approximately as the inverse cube of distance, and for representative conditions, assuming one ampere of dipole current, the threshold of detectability is at about 400 meters. It is also known that, for the actual problem of a submarine excited by an incident wave, the field configuration in air is such that separation of incident and secondary field can be obtained under certain conditions. The plane wave incident on the submarine from above gives rise to a scattered wave which spreads out from the submarine in all directions. If the wavelength in sea water is small compared with dimensions of the submarine (as for the case of frequencies greater than 100 kc), half of this scattered wave spreads out more or less uniformly and the other half is concentrated below the submarine. If the wavelength is large compared with the dimensions of the submarine as for the case of frequencies less than 100 cps, then all the scattered wave is sent out uniformly in all directions. The primary path of field propagation from an excited submerged submarine occurs through the air above the interface, that is, the sea-to-air boundary, and the field along the direct path through the water is negligible except for very small distances from the source. It has also been shown that the field in the air is determined solely by the horizontal currents in the radiating source and the effects of vertical currents in the source and of currents in the conducting medium may be neglected. Furthermore, because of continuity of the magnetic field across the sea-air boundary, the field just below the surface is the same as that just above the surface. The total electromagnetic field in the air above the excited submerged submarine is the vector sum of the primary and the secondary fields. The primary field is the field of the incident wavefront. The secondary field is composed of the scattered or reflected waves from the submarine and in addition if the object is excited, then the radiations that are caused by the excitation of the object.

Figure 21:
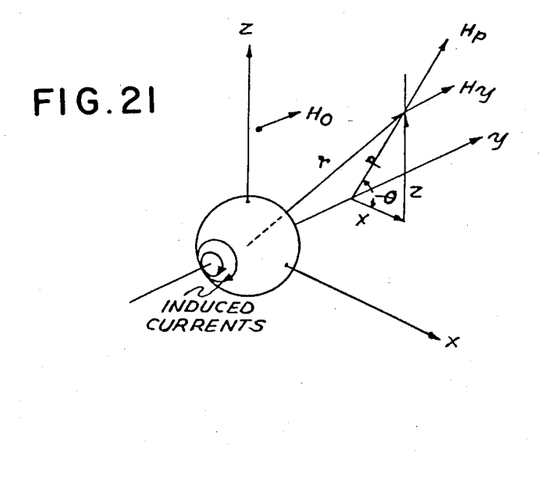
FIG. 21 is a diagram illustrating the reflected fields of a submerged sphere.

Referring to FIG. 21, assume the case where the applied field is a plane wave, a spherical submarine of radius a with constant $\sigma_c$, $\mu_c$ $\epsilon_c$, immersed in sea water with constants $\sigma_s$, $\mu_s$ $\epsilon_s$ and an applied magnetic field $H_o$. $\sigma$ is the conductivity of the medium, $\mu$ the magnetic permeability and $\epsilon$ is the dielectric constant.

For the case when $\sigma_c >> \sigma_s$, the secondary field is completely specified by the two components $$H_y = -\frac{3}{2} a^3 H \cdot (M + iN) \left( -\frac{1}{r^3} + \frac{3y^2}{r^5} \right)$$

$$H_p = \frac{3}{2} a^3 H \cdot (M + iN) \frac{3yp}{r^5}$$

where
$H_o$=applied field, amperes/meter
a=radius of sphere, meters
x, y, z, p in meters $$r = \sqrt{y^2 + p^2}$$

$$M + iN = \left[ -\frac{1}{K^2} + \frac{1}{3} \frac{-\cosh K}{K \sinh K} \right]$$

$$K = a[i\sigma_c \mu_c \omega - \epsilon_c \mu_c \omega^2]^{\frac{1}{2}} \times a[i\omega \mu_c \sigma_c]^{\frac{1}{2}}$$

$\omega = 2\pi f$, f in cps.

Using these expressions the magnetic field strength for the plane z=d can be determined in order to evaluate the secondary field in the air-sea boundary. At the point x=0, y=0, z=0, the field components are $$H_p = 0$$

$$H_y \approx \frac{a^3 H_o}{2 d^3}$$

To determine the applied $H_o$ due to a plane wave incident on the air-sea boundary, it can be shown that $$H'' = \left[ \frac{II'}{z_s} \right]^{\frac{1}{2}} = \left[ \frac{1.076 \times 10^{-5} II}{\frac{\sqrt{\omega \mu_s}}{2\sigma_s}} \right]^{\frac{1}{2}}$$

where
$H''$=transmitted field intensity, amperes/meter (in sea water)
$II''$=transmitted intensity, watts/meter$^2$ (in sea water)
$II$=incident intensity, watts/meter$^2$
$z_s$=intrinsic impedance of sea water, ohms.
Taking account of the attenuation in sea water $$H_o = H'' e^{-.00398 \sqrt{f} \, d}$$

After making the proper substitutions there is obtained the secondary field at the surface $$H_y \approx \frac{.052 \, a^3 \sqrt{II}}{d^3 \, e^{.00398 \sqrt{f} \, d}}$$

The original incident magnetic field H is given by $$H = \left[ \frac{II}{z_a} \right]^{\frac{1}{2}} = .0515 \sqrt{II}$$

where
$z_a$=intrinsic impedance of air, ohms.
The attenuation between incident and secondary fields is therefore $$\text{Attenuation db} = 20 \log_{10} \frac{H}{H_y} \approx 20 \log_{10} \left\{ \frac{d^3 e^{.00398 \sqrt{f} \, d}}{a^3} \right\}.$$

Figure 22:
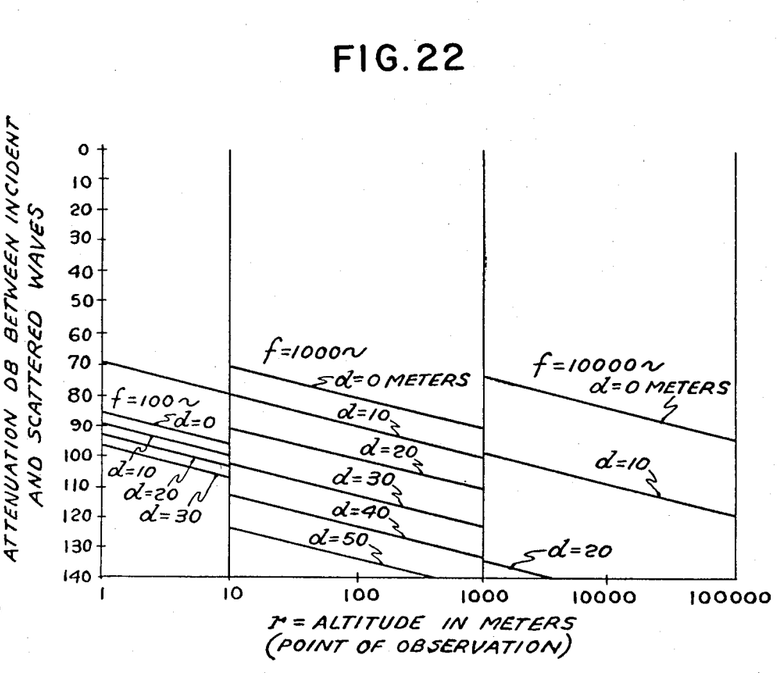
FIG. 22 is a graph showing the attenuation between incident and scattered waves.

At a frequency of 1000 cps, a depth of 10 meters, and a submarine radius of 5 meters, the attenuation in the magnetic field intensity is 29 db. Referring to FIG. 22, the plot of attenuation for the case of scattering, the corresponding figure is 71 db (the 1000~line extended to the 1 meter altitude). This is an improvement of 42 db.

Figure 23:
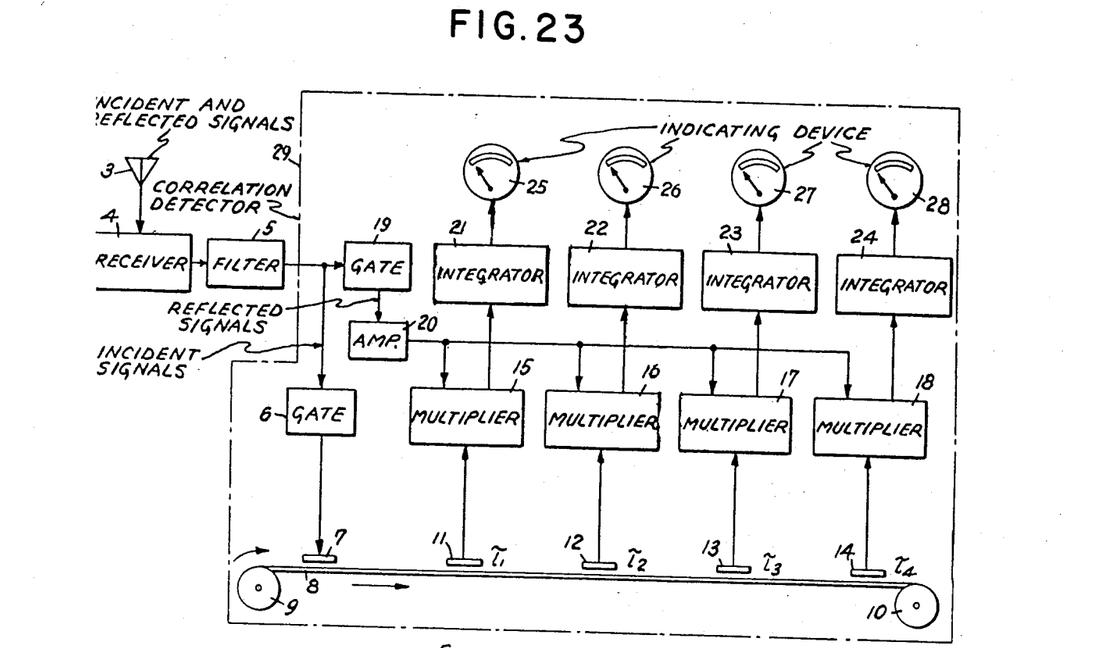
FIG. 23 is a block diagram of the embodiment of the detection system of this invention.

As described above, any lightning stroke produces electrical noise in the atmosphere which noise in the form of low frequency signals can be received at a distant source at some time after the stroke. The received signals can be from direct propagation or could be energy reflected from the clouds, from other objects on or above the surface, the bottom of the ocean or from objects submerged below the surface of the ocean. The waveform of the energy received from the ocean floor or from submerged objects would be similar to the waveform of the energy received by direct propagation from the stroke. It is possible to receive the energy received by direct propagation with the energy received due to the reflection of the energy of the direct stroke from the ocean floor or the submerged object, and to compare the two by means of the correlation technique to determine a time delay between the incident and reflected signals. FIG. 23 shows the embodiment of this invention for the detection of the presence and depth of submerged objects utilizing atmospheric noise, such as lightning flashes. The detection is accomplished by means of the correlation technique. An antenna 3 is adapted to receive both the incident signals on the propagated wavefront and the reflected signals from the submerged objects. The output of the antenna 3 is coupled to a conventional receiver 4 capable of receiving radio signals in the audio range where the signals are amplified, and the output of the receiver 4 is coupled to a filter 5 having a narrow bandwidth centered about a signal frequency in the frequencies of interest, that is, 250–2000 cps and 4000–15,000 cps, where the strong atmosphere signals predominate. From the filter 5, the signals are fed into a gate 6 where the threshold is at such a level that only the relatively high powered incident signals of the frequency selected will pass through. The signal output of the gate 6 is coupled to a magnetic read-in head 7 by which means the signals are recorded on the magnetic tape 8 in the conventional manner. The tape 8 is driven over pulleys 9 and 10 by a motor (not shown). As the tape travels along in the direction indicated by the arrow, it passes beneath read-out heads 11, 12, 13 and 14. Only these four read-out heads are shown for purpose of illustration though it is to be understood that more or less may be utilized as required. The output of the read-out heads 11, 12, 13 and 14 are fed respectively to multipliers 15, 16, 17 and 18. Each of the read-out heads 11, 12, 13 and 14 respectively represents time delays $\tau_1$, $\tau_2$, $\tau_3$, and $\sigma_4$, each successively greater than the other and each representing a specific time delay after the recording of the signals from the gate 6 at the read-in head 7. The output of the filter 5 is also fed into a gate 19 which has a threshold set so as to reject high amplitude signals such as the incident signals and to pass relatively low amplitude signals, such as the reflected signals. The output of gate 19 is fed into an amplifier 20 preferably a paramagnetic amplifier or any other low noise amplifier, to amplify the signal output of gate 19 to a level substantially equal to the amplitude of the incident signals. The output of the amplifier 20 is coupled to multipliers 15, 16, 17 and 18 where they are combined with the signal outputs respectively of the read-out head 11, 12, 13 and 14. The operation of the multipliers is such that where there is no coincidence of the signals from the read-out head and the amplifier 20 there would be no output from the respective multiplier. A small output relatively will result where there is a partial overlapping of the signals. The maximum output of the multipliers will occur when there is a maximum phase coincidence of the signal output of any of the read-out heads and the output of the amplifier 20 at any one of the multipliers. The outputs of the multipliers 15, 16, 17 and 18 are coupled respectively to integrators 21, 22, 23 and 24 and from thence the outputs are coupled respectively to indicating devices 25, 26, 27 and 28 which may be oscilloscopes or meters as the case may be. An indication of the maximum amplitude signal on either one of the indicating devices shows that the reflected signal and the incident signal are coinciding at a specific time delay. Each of the time delays $\tau_1$, $\tau_2$, $\tau_3$ and $\tau_4$ are so adjusted that they represent the time required for an incident signal of the frequency selected by the filter 5 to travel to a specific depth in sea water and back. The time required for the signal to travel through the air is disregarded because, as shown from the graph A of FIG. 12, the velocity of propagation in air is so much greater than the velocity of propagation in water that the propagation time in air can be safely disregarded. The indication on the specific scope therefore which shows the maximum amplitude signal gives the indication of the depth at which the submerged object is located.

Figure 24:
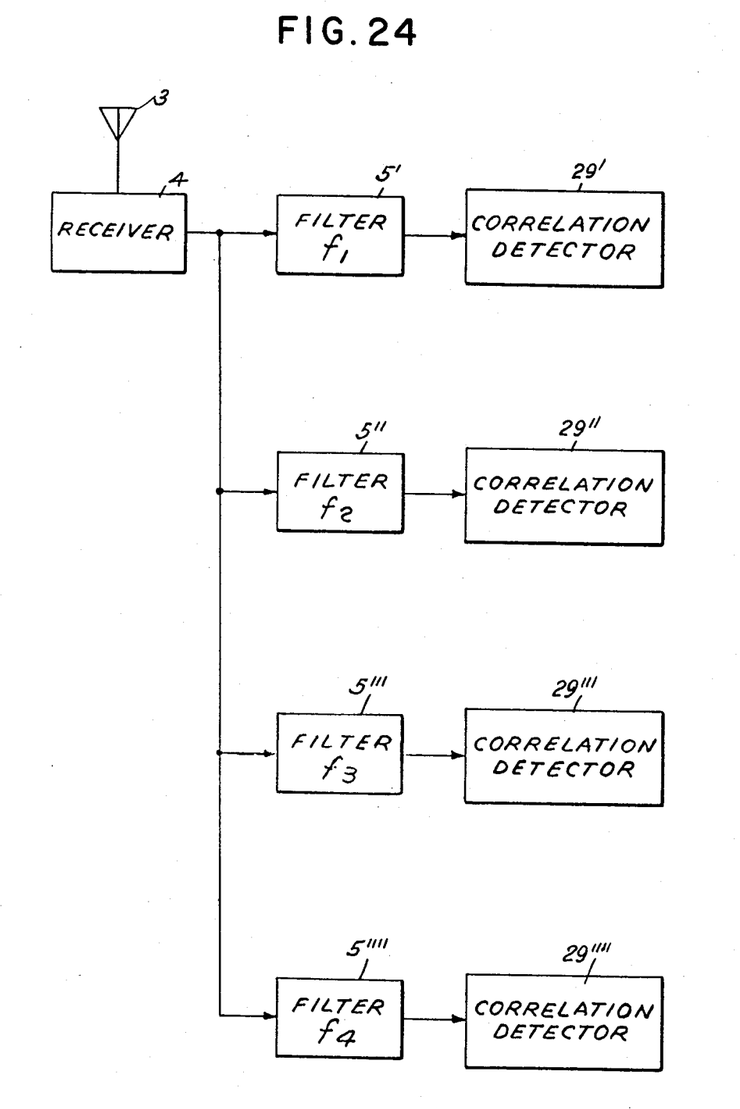
FIG. 24 is a block diagram of the detection system for a plurality of frequencies.

The above-described circuit elements following the filter 5 and enclosed in the broken line 29 are required for correlation detection. Only one filter for one frequency of interest has been shown in FIG. 23. However, the noise "spikes" or signals generated by lightning discharges do not produce the same signal amplitude for similar frequencies. The amplitude variations for identical frequencies in different lightning discharges are very great and to limit the system to one frequency is to limit its detection capability. Therefore, a plurality of filters for selected frequencies within the limits of the abovementioned audio frequency range are provided. With reference to FIG. 24, there is illustrated the extension of the block diagram of FIG. 23 to include a plurality of filters 5', 5'', 5''' and 5'''' for frequencies $f_1$, $f_2$, $f_3$ and $f_4$ and a plurality of corresponding correlation detectors 29', 29'', 29''' and 29'''' coupled respectively to the filters. There can, of course, be any number of filters for frequencies up to $f_n$. The circuit elements in the correlation detectors 29', 29'', 29''', etc. are the same except for the time delay $\tau_1$, $\tau_2$, $\tau_3$ and $\tau_4$. The depth indications in each of the correlation detectors must be the same, therefore, the time delay equal to the travel time of that particular frequency to and from the submerged object in sea water must vary proportionately to the velocity of that frequency in sea water. Notwithstanding the amplitude variations for identical frequencies of different noise signals, the frequency with the largest amplitude will provide the maximum indication on that particular meter to which its correlated output is coupled.

It is to be understood that the means for imposing different time delays on the incident signal is not limited to the tape recording means described herein but may be accomplished by other means such as delay lines.

The direction from which the reflected waves are coming may be ascertained by means of well known direction finder techniques. A loop antenna may be used or a horizontally polarized dipole capable of being rotated can also provide a high degree of direction finding.

While I have described have the principles of my invention in connection with specific apparatus, it is to be clearly understood that this description is made only by way of example and not as a limitation to the scope of my invention as set forth in the objects thereof and in the accompanying claims.

I claim:

1. A system for detecting the depth of an object submerged in a medium having radiation transmission characteristics substantially different than the atmosphere by use of radiated electromagnetic energy, comprising means to receive an incident radiation of a source of natural random electromagnetic energy having a multiplicity of frequencies regardless of the place of origin of said source or its distance from said receiving means and the reflection of said electromagnetic energy caused by the presence of an object submerged in said medium and means to compare selected frequencies of the reflected radiation with corresponding selected frequencies of the incident radiation to determine the time difference therebetween, the time difference detected being a measure corresponding substantially to the depth of the submerged object and proportional to the velocity of the selected frequencies of the radiation in said medium.

2. A system for detecting the presence and depth of an object submerged in a medium having transmission characteristics substantially different than the atmosphere by means of lightning, comprising means to receive an incident radiation of said ligntning regardless of the place of origin of said lightning or its distance from said receiving means and the reflection of said radiation caused by the presence of said submerged object within the range of said system, said reflection containing some of the frequencies of said incident radiation, means to derive from said received incident radiation and said reflected radiation frequencies common to both, means to compare said radiations of common frequencies to determine the time difference therebetween, the time difference detected being a measure corresponding substantially to the depth of the submerged object and proportional to the velocity of the common frequencies of the radiation in said medium.

3. A system for detecting the presence and depth of an object submerged in a medium having transmission characteristics substantially different than the atmosphere by means of lightning and regardless of the source of said lightning, comprising means to receive an incident radiation of said lightning, the source thereof being at an unknown distance from said receiving means, and the reflection of said radiation caused by the presence of said submerged object within the range of said system, said reflection containing some of the frequencies of said incident radiation, means to filter from said received incident radiation and said reflected radiation all frequencies outside of a given range of frequencies and means to compare the filtered reflected radiation with the incident radiation to determine the time difference therebetween, the time difference detected being a measure corresponding substantially to the depth of the submerged object and proportional to the velocity of the said range of frequencies in said given range of frequencies in said medium.

4. A system for detecting the presence and depth of an object submerged in a medium having transmission characteristics substantially different than the atmosphere by means of lightning and regardless of the source of said lightning, comprising means to receive an incident radiation of said lightning, the source thereof being at an unknown distance from said receiving means, and the reflection of said radiation caused by the presence of said submerged object within the range of said system, said reflection containing some of the frequencies of said incident radiation, means to filter from the said received incident radiation and said reflected radiation all frequencies outside of a given frequency, means to delay said filtered incident radiation and means to compare said delayed incident radiation with said filtered reflected radiation to determine the coincidence of said delayed incident radiation with said received reflected radiation, said coincidence indicating the time difference therebetween, said time difference being a measure corresponding substantially to the depth of the submerged object and proportional to the velocity of the given frequency of the radiation in said medium.

5. A system for detecting the presence and depth of an object submerged in a medium having transmission characteristics substantially different than the atmosphere by means of lightning and regardless of the source of said lightning, comprising means to receive an incident radiation of said lightning, the source thereof being at an unknown distance from said receiving means, and the reflection of said radiation by the presence of said submerged object within the range of said system, said reflected radiation containing some of the frequencies of said incident radiation, means to derive from said received incident radiation and said reflected radiation a frequency common to both, means to record said derived frequency of said received incident radiation, means to sequentially read out said recorded incident radiation at different times after the reception of said incident radiation, means to compare said filtered reflected radiation with said filtered incident radiations sequentially readout to determine the coincidence of said filtered reflected radiation with one of said readout sequences, said coincidence indicating the time difference between said incident radiation and said reflected radiation, the time difference detected being a measure corresponding substantially to the depth of the submerged object and proportional to the velocity of the common frequency of the radiation in said medium.

6. A system for detecting the presence and depth of an object submerged in a medium having transmission characteristics substantially different than the atmosphere by means of lightning and regardless of the source of said lightning, comprising means to receive an incident radiation of said lightning, the source thereof being at an unknown distance from said receiving means, and the reflections of said radiation caused by the presence of said submerged object within the range of said system, said reflected radiation containing some of the frequencies of said incident radiation, means to derive from said incident radiation and said reflected radiation a signal frequency common to both, means to impose varying time delays on said incident radiation, each of said delays indicating the time required for said frequency signal to travel to a specific depth in the submergence medium and from said depth to said receiving means, means to compare said delayed signal frequency of said incident radiation with said signal frequency of said reflected radiation to determine the coincidence of said reflected signal frequency with one of said delayed incident signals of said frequency, said coincidence indicating the time difference therebetween and the depth of said submerged object corresponding substantially to said time difference, said time difference being proportional to the velocity of said signal frequency in said medium.

7. A system for detecting the presence and depth of an object submerged in a medium having transmission characteristics substantially different than the atmosphere by means of lightning of different frequencies and regardless of the source of said lightning, comprising means to receive an incident radiation of said lightning, the source thereof being at an unknown distance from said receiving means, and the reflections of said radiation caused by the presence of said submerged object within the range of said system, said reflected radiation containing some of the frequencies of said incident radiation, means to derive from said incident radiation and said reflected radiation a plurality of discrete frequency signals common to both, means to impose on each derived discrete frequency of said incident radiation signal varying time delays, each of said delays indicating the time required for each said discrete frequency signal to travel a specific depth in the submergence medium and from said depth to said receiving means, means to compare said delayed signals of each said discrete frequency of said incident indication with the corresponding frequency signal of said reflected radiation to determine the coincidence of said reflected signal with one of said delayed incident signals of the same frequency, said coincidence indicating the time difference therebetween and the depth of said submerged object corresponding substantially to said time difference, said time difference being proportional to the velocity of said frequency signal in said medium.

* * * * *